: 3,103,417
Patented Sept. 10, 1963

3,103,417
PRODUCTION OF BORON COMPOUNDS
Frederick Maurice Tayler and John Dewing, Norton-on-Tees, England, assignors to Imperial Chemical Industries Limited, London, England, a corporation of Great Britain
No Drawing. Filed Nov. 10, 1959, Ser. No. 851,958
Claims priority, application Great Britain Nov. 25, 1958
13 Claims. (Cl. 23—204)

This invention relates to the production of boron compounds and in particular to the production of borine amines and diborane.

Borine amines are useful as reducing agents and as intermediates in the preparation of other boron compounds. Diborane is useful as an intermediate in the production of high energy fuels and other boron compounds.

Processes are known for the production of borine amines using either alkali metal borohydrides or alkali metal trimethoxy borohydrides as intermediates. Since in the production of either of these intermediates an alkali metal hydride is employed they are correspondingly expensive.

It is one object of the present invention to provide a process for the production of borine amines which is efficient and yet based on simpler and more easily available starting materials than the processes of the prior art.

According to the present invention therefore there is provided a process for the production of borine amines which comprises bringing a complex compound of a secondary or tertiary amine and a boron halide into contact with hydrogen at elevated pressure and temperature in presence of a substance as hereinafter defined which combines with the hydrogen halide formed in the reaction.

The boron halide may be boron trichloride, boron tribromide or boron trifluoride. It is preferred to use boron trichloride.

The secondary or tertiary amine may be an alkylamine, an aralkylamine, an arylamine, a hydrogenated heterocyclic amine or an amine containing more than one type of organic radical. The process of the invention is particularly suitable for the production of borine amines in which the amine component is a tertiary alkylamine, e.g. trimethylamine or triethylamine.

The amine/boron halide complex in contact with hydrogen yields a hydrogen halide as well as a borine amine. It is therefore very desirable to carry out the process of the invention in the presence of at least the stoichiometric quantity of a substance which will combine with the hydrogen halide. This substance is preferably the amine which is complexed with the boron halide; other basic materials however may be used provided that in combining with hydrogen halide they do not react undesirably with any of the reactants or products and do not give products which so react. Metals are suitable if sufficiently electropositive: thus aluminium may be used.

The process should be carried out at elevated pressure, for example in the range 100–10,000 atmospheres and preferably in the range 1000–4000 atmospheres. The process should be carried out at elevated temperature preferably in the range 180° C. to 250° C. It appears that a better yield of borine amine is obtained when the hydrogen pressure is in the higher part of the range and the temperature is in the lower part of the range than when the reverse is true.

The process of the invention may be carried out in the presence of a solvent which may be, for example a hydrocarbon or an excess of the aforesaid amine, and should be carried out under substantially anhydrous conditions.

It is a particular further feature of the invention to react the borine amine produced with a boron halide, e.g. boron trichloride or boron trifluoride, to give diborane and an amine complex of the boron halide which may be separated and recycled for the production of further quantities of the borine amine. For this purpose the amine component of the complex is preferably trimethylamine since boron halide complexes of trimethylamine are more stable than those of other amines which may be used in the process of the invention.

The invention thus also comprises a process for the production of diborane which is based on a cheap starting material, i.e. a boron halide, and which is particularly suitable for large scale operation because of its cyclic nature.

Example 12 grams trimethylamine-boron trichloride complex and 40 cc. trimethylamine were introduced under strictly anhydrous conditions into an autoclave which was then heated to 200° C. and pressurized with hydrogen to 2000 atmospheres. During the first hour of the experiment the pressure fell steadily and then remained substantially constant. After 60 hours, the pressure was let-down and 22 grams solid material discharged from the autoclave. Sublimation of a small portion of this material yielded a sublimate of crystalline borine-trimethylamine (melting point 92° C.). The remainder of the solid material was extracted with diethyl ether giving an extract containing 1.2 grams borine-trimethylamine and 0.3 gram trimethyl ammonium chloride. The yield of borine-trimethylamine obtained was about 25% before allowing for mechanical losses.

We claim:

1. A process for the production of borine-tertiary amines which comprises bringing a complex compound of a boron halide selected from the group consisting of boron trichloride, boron tribromide and boron trifluoride and a tertiary amine selected from the group consisting of tertiary amines having as the sole substituents alkyl, aralkyl, aryl and hydrogenated heterocyclic groups into contact with hydrogen at elevated pressure and temperature in presence of at least one tertiary amine selected from the group consisting of tertiary amines having as the sole substituents alkyl, aralkyl, aryl and hydrogenated heterocyclic groups which combines with the hydrogen halide formed in the reaction.

2. A process as claimed in claim 1 wherein the hydrogen pressure is in the range 1000–4000 atmospheres.

3. A process as claimed in claim 1 wherein the temperature is in the range 180–250° C.

4. A process as claimed in claim 1 wherein the boron halide is boron trichloride.

5. A process as claimed in claim 1 wherein the amine component of the boron halide tertiary amine complex is a tertiary alkylamine.

6. A process as claimed in claim 5 wherein the tertiary amine is trimethylamine.

7. A process as claimed in claim 1 wherein the tertiary amine which combines with the hydrogen halide is a further quantity of the tertiary amine which is complexed with the boron halide and is present in at least the stoichiometrical proportion.

8. A process as claimed in claim 7 wherein the tertiary amine is a tertiary alkylamine.

9. A process as claimed in claim 7 wherein the tertiary alkylamine is trimethylamine.

10. A process for the production of borine-tertiary alkylamines which comprises bringing a complex compound of boron trichloride and a tertiary alkylamine into contact with hydrogen at a pressure in the range 1000–4000 atmospheres and a temperature in the range 180°–250° C. in the presence of at least that amount of the same tertiary alkylamine which is stoichiometrically required to combine with the hydrogen chloride formed in the reaction.

11. A process as claimed in claim 10 wherein the tertiary alkylamine is trimethylamine.

12. A process as claimed in claim 10 wherein the tertiary alkylamine borane produced is after separation reacted with boron trichloride in a further stage to give diborane and the boron trichloride complex formed is recycled to the first stage of the process, whereby boron trichloride is converted to diborane.

13. A process as claimed in claim 12 wherein the tertiary alklamine is trimethylamine.

References Cited in the file of this patent

UNITED STATES PATENTS 2,860,167   Brown _____ Nov. 11, 1958

OTHER REFERENCES

Koster et al.: Angewandte Chemie, vol. 69, pages 94–95 (1957).